June 21, 1938.   H. C. ROBINSON   2,121,163
START-STOP DISTRIBUTOR SYSTEM
Original Filed July 10, 1933   2 Sheets-Sheet 1

Patented June 21, 1938

2,121,163

UNITED STATES PATENT OFFICE 2,121,163

START-STOP DISTRIBUTOR SYSTEM

Harold C. Robinson, Chicago, Ill., assignor to Associated Electric Laboratories, Inc., Chicago, Ill., a corporation of Delaware Application July 10, 1933, Serial No. 679,652
Renewed August 24, 1934

28 Claims. (Cl. 178—23)

The present invention relates in general to start-stop distributor systems.

The main object of the present invention is the provision of an improved start-stop distributor system for the transmission and receipt of coded information.

Another object of the present invention is to provide a one-wire distributor, transmission, and check-back system which transmits and checks such transmission at each revolution of the distributor.

A feature of the invention relates to the transmitting and receiving circuit arrangement whereby the transmitting distributor at each revolution thereof both transmits a code to the receiving distributor and receives the same code transmitted back by the receiving distributor to check the accuracy of the transmission and the receipt of the code.

A further feature relates to the novel means for indicating the correct transmission and receipt of codes.

These and other features will be more readily understood from a consideration of the following specification taken in connection with the accompanying drawings, in which:

Fig. 1 shows the apparatus and circuit equipment at a transmitting office, while

Figures 1, 1A:
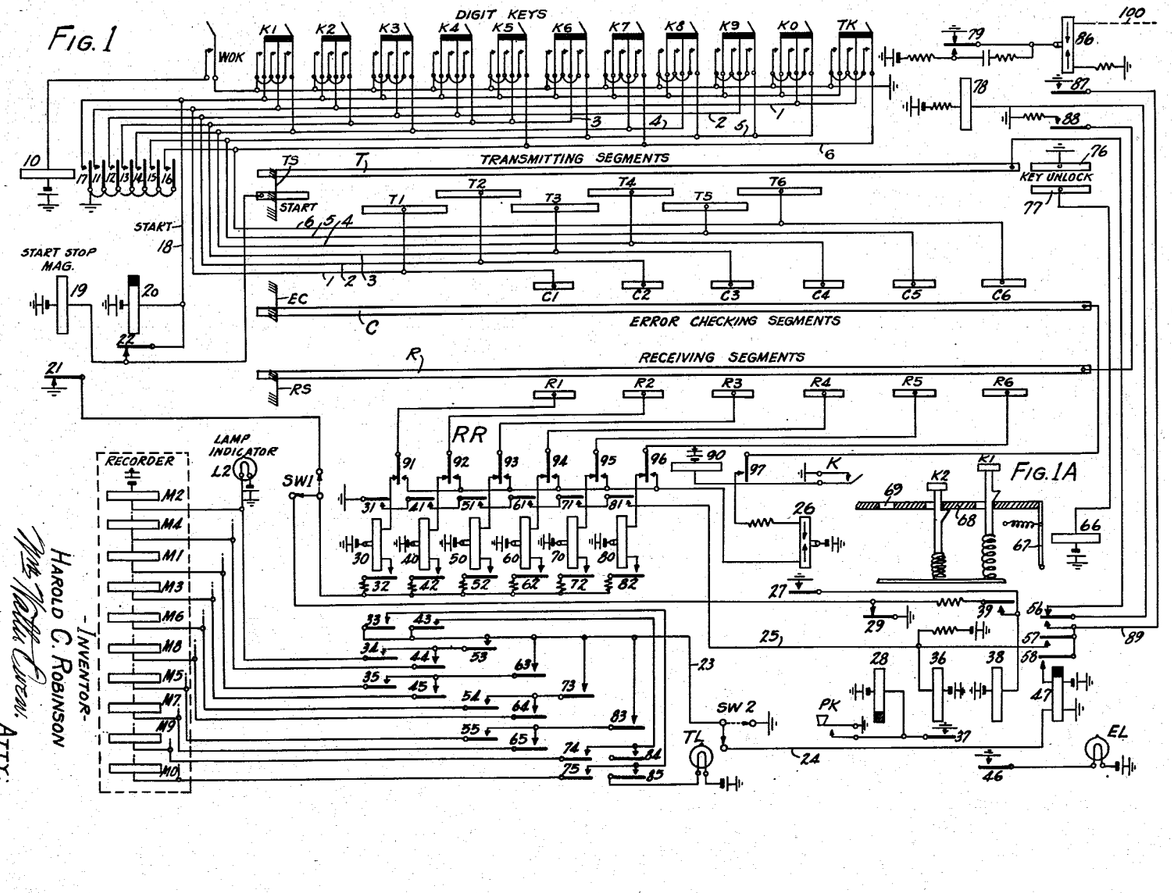

Referring now to Fig. 1 in detail, the transmitting distributor apparatus comprises the well-known type of start-stop rotary distributor having a start-stop magnet 19, a start segment, transmitting segments T, T1 to T6, inclusive, receiving segments R, R1 to R6, inclusive, checking segments C, C1 to C6, inclusive, and co-operating brushes TS, EC, and RS. The key unlocking segments 76 and 77 are also provided for co-operation with the brush TS. The digit keys K1 to K0, inclusive, are connected to the start conductor 18 and to the transmitting segments T1 to T6, inclusive, by way of conductors 1 to 6, inclusive. A wipe-out key WOK and a transfer key TK are also provided to cause the transmitting distributor to transmit the wipe-out and transfer codes.

A set of recording relays RR are shown normally connected to the receiving segments R1 to R6, inclusive, and control circuits for operating the lamp indicator or a recorder. The lamp indicator is illustrated by one of the lamps, such as L2, and the recorder may be a recording printer of any well-known make or a recording punch or both. The recorder comprises ten magnets or relays M1 to M0, inclusive, for controlling the operation of the recorder. A turn key K is provided for controlling the operation of the relay which disconnects the receiving segments from the recording relays and connects the receiving segments to an error-checking relay when the recorder or lamp indicator is not used. The transmitting and receiving circuit between the transmitting distributor in Fig. 1 and the receiving distributor in Fig. 2 comprises the well-known duplex circuit arrangement in which the differential relays 86 and 101 respond to incoming pulses over the conductor 100 while the pulsing relays 78 and 104 transmit such pulses under control of the distributors.

Fig. 1a diagrammatically illustrates the manner in which the push keys are locked when operated and unlocked near the end of each revolution of the transmitting distributor by the operation of magnet 66.

Figure 2:
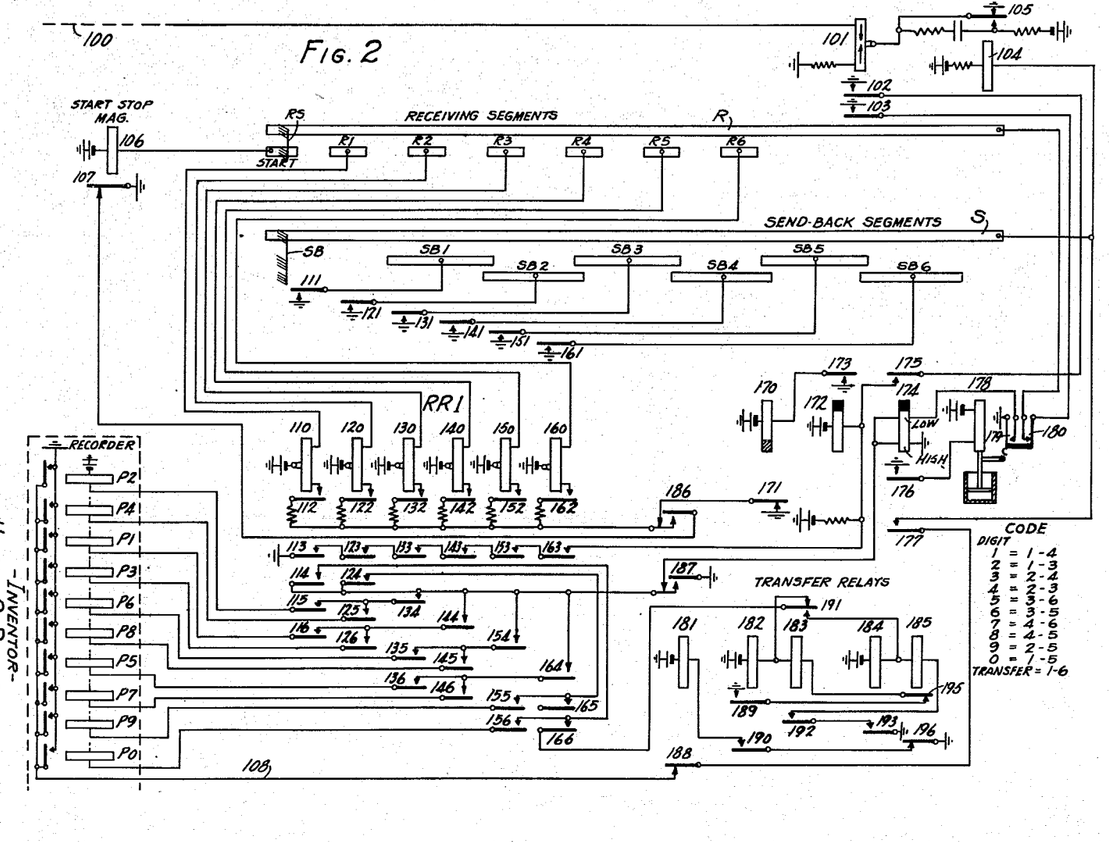
Fig. 2 shows the apparatus and circuit equipment at the remote receiving office.

Fig. 2 shows the receiving distributor in the remote office and is of the well-known rotary start-stop type. The receiving segments R1 to R6, inclusive, are connected to the recording relays RR1. The recording relays RR1 control circuits for grounding the send-back segments SB1 to SB6 inclusive, and also control circuits for operating the recorder shown at the lower left-hand corner of Fig. 2. This recorder may be any well-known printer, recorder or punch, or both, and comprises ten magnets or relays T1 to T0, inclusive, for controlling its operation. To the right and center of the drawing is shown a group of relays which are used when this type of system is used for remote control of switching apparatus wherein the recording relays RR1 instead of controlling a recorder will control the desired switching apparatus. In the lower right-hand corner of the drawing are shown the transfer relays which disconnect the remote control relay group to permit speedier or continuous operation of the distributors. The code used in this system is shown in the lower right-hand corner of Fig. 2.

The two distributors are arranged to operate in synchronism. The motor of the transmitting distributor in Fig. 1 comprises a motor governed to rotate at a predetermined speed while the motor for operating the brushes of the receiving distributor in Fig. 2 comprises a synchronous motor which operates at a predetermined speed.

Having briefly described the apparatus a detailed description of the circuit operation will now be given. The operator therefore operates the digit keys shown in Fig. 1 in accordance with the message or digits to be transmitted to the remote office.

Assuming that the key K1 is the first key operated by the operator, then when such key is pushed down the same is locked by the plate 68 in the manner illustrated in Fig. 1a. It will be noted that each of the keys K1 to K0, inclusive, has one spring of each pair therein grounded. In response to the operation of key K1 the outer left-hand pair of springs connects ground to start conductor 18, the center pair connects ground to conductor 1, and the right-hand pair connects ground to conductor 4. The transmitting segments T1 and T4 are therefore grounded by the operation of key K1. Responsive to the grounding of the start conductor 18 the start-stop magnet 19 is energized by way of armature 22 to release the brushes TS, EC, and RC. The grounding of start conductor 18 also closes a circuit for energizing the pulse relay 78 as follows: from grounded start conductor 18, armature 22, start segment, brush TS, transmitting segment T, resting contact of armature 56 and said armature, and through the winding of relay 78 and resistance to battery. The slow-to-operate relay 20 is also energized by way of the grounded start conductor 18 and operates a predetermined time after both the start-stop magnet 19 and the pulse relay 78 are energized. Relay 20 at armature 22 opens the original energizing circuit of the start-stop magnet 19 and pulse relay 78 shortly after the brushes of the distributor have started on their revolution. Pulse relay 78, upon energizing, at armature 79 and its working contact, completes a circuit for energizing the duplex differential relay 101 in Fig. 2 over the following circuit: from ground by way of the resting contact of armature 105 and said armature, through the upper winding of differential duplex relay 101, conductor 100, through the upper winding of differential duplex relay 86, and by way of armature 79 and its working contact through the resistance to battery. Duplex relay 86 does not energize at this time because a balancing circuit is closed through its lower winding and since the windings are equal and oppose each other the relay 86 will not energize at this time. The differential duplex relay 101 in Fig. 2 has an energizing circuit completed through its upper winding while its lower winding is short circuited from ground at armature 105 with the result that only the upper winding is excited and therefore the relay will energize and operate its armature. The energizing circuit to relay 78 is terminated either by the operation of armature 22 as previously described or in response to the transmitting brush TS leaving the start segment at the start of its revolution. The deenergization of pulse relay 78 terminates the pulse over the conductor 100 with the result that the duplex relay 101 also deenergizes. This pulse thus transmitted from the transmitting distributor to the receiving distributor in Fig. 2 is the start pulse and therefore the energization of relay 101 at armature 103 completes a circuit for energizing the start-stop magnet 106 as follows: from ground by way of armature 103, springs 180 controlled by the dash-pot relay 178, receiving segment R, receiving brush RS, start segment, and through the winding of the start-stop magnet 106 to battery. The start-stop magnet 106 is energized over this circuit and releases the brushes RS and SB of the receiving distributor in the well-known manner. The brushes of the transmitting distributor and the receiving distributor are therefore practically simultaneously started. The circuit to the start-stop magnet 106 is either interrupted by the deenergization of relay 101 or when the brush RS leaves the start segment.

Returning now to the transmitting distributor and at a time when the transmitting brush TS encounters the grounded transmitting segment T1, a circuit may be traced for operating the pulse relay 78 as follows: from ground by way of the center springs of key K1, conductor 1, transmitting segment T1, brush TS, transmitting segment T, and thence over the previously traced circuit through the winding of pulse relay 78 to battery. The pulse relay 78 is maintained energized over this circuit as long as the transmitting brush TS encounters a grounded transmitting segment. The operation of the pulse relay 78 transmits a pulse over the conductor 100 for operating the relay 101 in the same manner as previously described. Shortly after the brush TS encounters the grounded transmitting segment T1 the brush RS in the receiving distributor will engage the first receiving segment R1 and since relay 101 is energized at this time a circuit may now be traced for energizing the recording relay 110 as follows: from ground by way of armature 103, springs 180, receiving segment R, receiving brush RS, receiving segment R1, and through the upper winding of recording relay 110 to battery. Relay 110, upon energizing, at armature 112 completes a locking circuit through its lower winding as follows: from grounded armature 171, normally closed contacts controlled by armature 186, through the resistance at armature 112 and lower winding of relay 110 to battery. At armature 113 relay 110 prepares a point in the chain circuit for operating relay 172; at armatures 114, 115, and 116 prepares circuits for operating the magnets of the recorder or switching devices; and at armature 111 grounds the send-back segment SB1. When the transmitting brush TS leaves the segment T1, pulse relay 78 deenergizes to terminate the pulse to relay 101. The circuit for initially energizing relay 110 is opened in response to the brush RS rotating past the segment R1.

When the sending brush SB engages the send-back segment SB1, a circuit may be traced for energizing the pulse relay 104 as follows: from grounded armature 111, send-back segment SB1, brush SB, segment S, and through the winding of pulse relay 104 and resistance to battery. Pulse relay 104, upon energizing, at armature 105 disconnects ground from the winding of relay 101 and connects negative battery through a resistance and through both the windings of relay 101. Relay 101 will not energize at this time because the two windings are equal and oppose each other. However, a circuit may be traced from the upper winding of this relay over conductor 100 and through the upper winding of differential relay 86 to ground at armature 79. Relay 86 alone is energized over this circuit and at armature 88 connects ground to receiving segment R. The differential relay 86 energizes over the above-traced circuit because the lower winding is short circuited by ground at armature 79. When the receiving brush RS in the transmitting distributor engages the receiving segment R1, which it does shortly after the send-back brush of the receiving distributor engages the send-back segment SB1, a circuit may be traced for operating the recording relay 30 as follows: from ground by way of armature 88, segment R, brush RS, segment R1, armature 91 and its resting contact, and through the upper winding of recording relay 30 to battery. Relay 30, upon energizing, at armature 31 prepares a point in the chain circuit for energizing relay 36; at armature 32 completes a locking circuit for itself through its lower winding from grounded armature 29; and at armatures 33, 34, and 35 prepares circuits for operating certain magnets in the recorder or for lighting certain indicator lamps in the indicator.

The brushes of the two distributors continue on their rotation and when the transmitting brush TS engages the transmitting segment T4, a circuit may be traced for energizing the pulse relay 78 as follows: from ground through the right-hand springs of key K1, conductor 4, transmitting segment T4, brush TS, segment T, and thence over the previously traced circuit to the pulse relay 78. The pulse relay 78 is energized over the above traced circuit and transmits a pulse over the conductor 100 as long as the brush TS engages the grounded bank segment T4. Shortly after the brush TS in the transmitting distributor engages the transmitting segment T4, the receiving brush RS in the receiving distributor engages the receiving segment R4. The relay 101 is energized by the pulse transmitted over conductor 100 and at armature 103 completes a circuit for energizing relay 140 as follows: from grounded armature 103, springs 180, segment R, brush RS, segment R4, and through the upper winding of recording relay 140 to battery. Relay 140, upon energizing, at armature 141 grounds the send-back segment SB4; at armature 142 completes a locking circuit for itself through its lower winding, from grounded armature 171; and at armature 144 completes a circuit for energizing relay 174. The closure of armatures 145 and 146 are without effect at this time since the relays 130, 150, or 160 are not operated. It should be noted that only two of the recording relays are operated for any one code and that only one circuit is closed by such a combination for operating a recorder magnet or a switching device. In the particular case just illustrated the circuit closed by the operation of recording relays 110 and 140 is as follows: from ground through the lower high-resistance winding of relay 174, normally closed contacts controlled by armature 187, armature 144, armature 116, and through the winding of magnet P1 to battery. The magnet P1 is not energized over this circuit on account of the high resistance in the lower winding of relay 174. Relay 174, however, energizes over the above-traced circuit and at armature 175 prepares a point in the circuit for energizing relay 172, at armature 177 prepares a point in the circuit for energizing the pulse relay 104; and at armature 176 completes a circuit for operating the dash-pot relay 178. The dash-pot relay 178 is energized and very slowly operates on account of the oil in the well shown directly below the relay.

As soon as the send-back brush SB engages the send-back segment SB4, a circuit may be traced for energizing the pulse relay 104 as follows: from grounded armature 141, send-back segment SB4, brush SB, segment S, and through the winding of pulse relay 104 to battery. A pulse is therefore transmitted back over the conductor 100 to the transmitting distributor whereupon the differential relay 86 is energized in the same manner as previously described. Shortly after the brush SB engages the grounded send-back segment SB4 in the receiving distributor the brush RS in the transmitting distributor will engage the receiving segment R4, at which time a circuit may be traced for recording relay 60 as follows: from ground by way of armature 88, segment R, brush RS, segment R4, armature 94 and its resting contact, and through the upper winding of recording relay 60 to battery. Relay 60, upon energizing, at armature 62 completes a locking circuit for itself through its lower winding from grounded armature 29 and at armature 63 completes a circuit for energizing the relay 47 in series with the magnet M1 or the lamp L1 (not shown) in the lamp indicator. This circuit may be traced as follows: from ground through the lower winding of relay 47, switch SW2, armature 63, armature 35, and from thence through the winding of magnet M1 to battery or through the lamp L1 (not shown) to battery. The recording relays RR are operated in combinations of two to complete only one circuit and in this particular instance it will be seen that the only circuit completed is the circuit through armatures 35 and 63 for lighting the lamp L1 or operating the magnet M1 of the printing recorder. Referring to the code shown in Fig. 2, the left-hand vertical column represents the key or device operated while the double vertical column represents the code or the combination of recording relays operated. For example, when the digit 1 is transmitted the key K1 is operated to transmit the code 1—4 which causes the first and fourth recording relays to be operated to in turn operate the first device or first lamp in the indicator.

By the operation of the recorder magnet M1 or the lamp L1 the operator is given an indication that the proper code has been transmitted and sent back and therefore the proper switching device or recorder magnet has been selected. Relay 47, upon energizing, at armature 56 and its resting contact disconnects the transmitting segment T and at its working contact connects the pulse relay 78 to conductor 89; at armature 57 prepares a point in the circuit for relay 36; and at armature 58 prepares a locking circuit for itself including its upper winding. Just before the brush TS completes its first revolution said brush engages the grounded segment 76 whereupon a circuit may be traced for energizing the key unlock magnet 66 as follows: from ground by way of segment 76, brush TS, segment 77, and through the winding of key unlock magnet 66 to battery. Magnet 66, upon energizing, operates its armature 67 to move the locking bar 68 to permit the key K1 to release to its normal position. The magnet 66 is deenergized when the brush RS leaves the segments 76 and 77, after which the brushes TS, EC, and RS are stopped in their normal positions or the positions shown in the drawings by the start-stop magnet 19.

From the foregoing it will be seen that in a single revolution of the two distributors, the transmitting distributor has sent the code 1—4 for digit 1 over wire 100 to the receiving distributor which in turn has sent back the same code it received over wire 100 to cause the transmitting distributor, through the receiving segments, to operate a recorder or indicator which indicates if the transmission is correct. In the receiving transmitter the remote recorder or device is prepared for operation and if no wipe-out signal is transmitted then the recorder or device is operated after a predetermined time by the operation of the dash-pot relay 178. The dash-pot relay 178 operates its springs 179 and 180 only a predetermined time after its circuit is closed by the energization of relay 174. This time interval is sufficient to allow the operator at the transmitting station to see if the proper code has been transmitted and received and to transmit a wipe-out code to release the prepared connection in case some fault has occurred. When dash-pot relay 178 closes springs 179, a circuit may be traced for operating the prepared recorder magnet P1 as follows: from grounded springs 179, through the upper low-resistance winding of relay 174, normally closed springs controlled by armature 187, armature 144, armature 116, and through the winding of recorder magnet P1 or the magnet of a switching device to battery. At springs 180 dash-pot relay disconnects the receiving segment R from armature 103. When the switching device or magnet P1 operates, a circuit is closed by the armature of such device to ground conductor 108, thereby completing a circuit by way of armature 188, armature 177, for energizing relay 104. The energization of relay 104 at this time now transmits a pulse back over the conductor 100 to indicate the actual operation of the switching device or recorder magnet. This impulse operates the relay 86 to close the following circuit. At armature 87 relay 86 completes a circuit by way of the working contact of armature 56 and said armature for energizing the pulse relay 78 and by way of armature 57 for operating relay 36 and by way of armature 58 for completing a locking circuit through the upper winding of relay 47. By the operation of pulse relay 78 a pulse is transmitted over the conductor 100 for operating the relay 101 in the remote office. Responsive to the energization of relay 36, said relay at armature 37 completes a circuit for energizing relay 28 whereupon the latter relay at armature 29 opens the locking circuit of the locked recording relays 30 and 60 which thereupon likewise deenergize. The pulse transmitted back over conductor 100 operates relay 101 which at armature 102 completes a circuit for energizing relay 172 by way of armature 175. Relay 172, upon energizing, at armature 173 closes a circuit for energizing relay 170 which at armature 171 opens the locking circuit of the operated recording relays 110 and 140. Responsive to the deenergization of the recording relays 110 and 140 the magnet P1 and relay 174 deenergize. The deenergization of relay 174 at armature 177 opens the circuit of the pulse relay 104 to terminate the pulse to the transmitting office, at armature 175 opens the circuit to relay 172 and at armature 176 opens the circuit of the dash-pot relay 178. After a short interval the relay 172 deenergizes and in turn causes the deenergization of the slow-to-release relay 170. The deenergization of relay 170 again grounds armature 171 to provide the locking circuit for the recording relays. The deenergization of the dash-pot relay 178 restores the springs 179 and 180 to their normal positions whereupon the springs 180 prepare the start circuit for enabling the start pulse of the next code to operate the start-stop magnet 106. Responsive to the termination of the pulse from the receiving distributor relay 86 deenergizes, thereby opening the circuit to relays 78 and 47, whereupon such relays deenergize to restore the relays and apparatus to normal position in readiness for the next code. From the foregoing it can be seen that when the device in the remote office operated a pulse is transmitted back to the transmitting distributor to indicate the actual operation of the remote device or recorder after which the transmitting and receiving apparatus return to normal position ready for another code transmission.

In case of trouble the transmitting distributor will not receive the same code as it transmitted and the recorder or lamp indicator will therefore indicate the trouble to the operator. The operator will thereupon operate the wipe-out key WOK to wipe out the set-up and release the remote prepared recorder or device before the same is operated in response to the complete operation of the dash-pot relay 178. Responsive to the operation of the wipe-out key WOK relay 10 is energized over an obvious circuit and grounds the start conductor 18 and conductors 1 to 6, inclusive. Responsive to the grounding of the start conductor 18 the start-stop magnets 19 and 106 and relay 20 are operated as previously described with the result that the two distributors are now started in operation. Since all of the transmitting segments T1 to T6, inclusive, are grounded, the pulsing relay 78 is therefore continuously energized during the time it takes the brush TS to pass from the segment T1 beyond the segment T6. The differential duplex relay 101 at the receiving distributor is therefore energized during this time or the time it takes the brush RS to pass from the segment R1 beyond the segment R6. The brush RS therefore successively connects ground from armature 103 to the successive receiving segments R1 to R6, inclusive, for successively energizing the recording relays 110, 120, 130, 140, 150, and 160. The recording relays therefore energize in succession and lock themselves in energized position through their lower windings in the same manner as previously described. At armatures 111, 121, 131, 141, 151, and 161 the recording relays ground the send-back segments SB1 to SB6, inclusive, and therefore when the send-back brush SB encounters these segments the pulse relay 104 is energized for the duration it takes the send-back brush SB to pass from the send-back segment SB1 beyond the send-back segment SB6. Pulse relay 104 sends a long wipe-out pulse over the conductor 100 to the duplex relay 86 which is energized for the duration of this pulse. At armature 88 the duplex relay 86 grounds the receiving segment R with the result that the recording relays 30, 40, 50, 60, 70, and 80 are energized successively. The recording relays in the transmitting distributor therefore energize and lock themselves through their lower windings in the same manner as previously described. Since all of the recording relays are now energized the chain circuit for energizing the relay 36 may be traced as follows: from ground by way of armature 31, armatures 41, 51, 61, 71, 81, and through the winding of relay 36 to battery. At armature 37 relay 36 closes the circuit for energizing relay 28 which thereupon energizes and at armature 29 opens the locking circuit of the recording relays which thereupon deenergize. In the receiving distributor the recording relays are all energized with the result that the chain circuit for energizing relay 172 is completed as follows: from grounded armature 113 and by way of armatures 123, 133, 143, 153, and 163 and through the winding of relay 172 to battery. Relay 172 is energized over the above-traced circuit and at armature 173 completes a circuit for energizing relay 170. At armature 171 relay 170 opens the locking circuit of the recording relays with the result that the recording relays are all now deenergized. Since the dash-pot relay 178 only operates its springs 179 and 180 after a predetermined time, the receipt of the wipe-out code just described is therefore received before the dash-pot relay 178 has had time to operate the springs 179 and 180. The wipe-out code has therefore wiped out or released the prepared circuit for operating the selected recorder or switching device before the same is actually operated. After the release of the recording relays the circuit to relay 172 is opened whereupon this relay deenergizes and opens the circuit of relay 170. After an interval relay 170 deenergizes and again at armature 171 prepares the locking circuit for the recording relays. In the transmitting distributor in a similar manner the deenergization of the recording relays therein opens the circuit of relay 36 which thereupon deenergizes and opens the circuit of relay 28. After an interval relay 28 deenergizes and again establishes the locking circuit for the recording relays at armature 29. The brushes of these two distributors are now stopped in their starting positions and all of the apparatus is now in normal position ready to transmit the next code. The foregoing circuits just described are especially adaptable for use in remote control systems where a positive check is required to insure that the proper device is selected and that the device has actually operated.

The circuits can readily be changed to a printing telegraph system by the operation of switches SW1 and SW2 and the operation of the transfer key TK. By the operation of the switch SW1 the locking circuit of the recording relay is transferred from armature 29 to armature 21 of the start-stop magnet 19. In this case the recording relays which have been operated in response to the last transmitted code are maintained in operated position over their locking circuit until the start magnet is energized subsequently in response to transmitting a succeeding code. By the operation of the switch SW2 the relay 47 is disconnected from the operating circuit with the result that the relays 28, 36, and 47 are no longer employed since the release of the recording relays is now dependent upon the operation of armature 21 of the start-stop magnet 19. Responsive to the operation of the transfer key TK the start conductor 18 is grounded by the left-hand pair of springs while the conductors 1 and 6 are grounded by the center pair and the right-hand pair of springs. The start-stop magnets 19 and 106 are now energized in the same manner as previously described to start the two distributors in operation. The start-stop magnet, upon energizing, at armature 21 unlocks any of the recording relays which at this time may be in operated position. Relay 20 is likewise energized in the same manner as previously described to open the circuit to the start-stop magnet 19 at armature 22. Since the transfer key TK is locked in operated position during the revolution of the transmitter distributor brushes the transmitting segments T1 and T6 are therefore grounded and when the brush TS encounters the first and sixth segments during its revolution the pulsing relay 78 is energized in the same manner as previously described to operate the duplex relay 101 associated with the receiving distributor in the receiving office. Since the two distributors operate in synchronism the relay 101 will be operated at the time when the brush RS engages the receiving segments R1 and R6 with the result that the recording relays 110 and 160 will be operated through their upper windings from ground by way of armature 103 and the receiving segments R, R1 and R6. As before, relays 110 and 160 at armatures 111 and 161 ground the send-back segments SB1 and SB6 with the result that the pulse relay 104 is operated during the interval the brush SB is in engagement with the segments SB1 and SB6. In a manner similar to that previously described, the pulse relay 104 causes the operation of the duplex relay 86 over conductor 100 to connect ground by way of armature 88 to the receiving segment R in the transmitting distributor at a time when the brush RS engages the receiving segments R1 and R6. Recording relays 30 and 80 are therefore operated and lock by way of their lower windings to grounded armature 21 on the start-stop magnet 19. A circuit may now be traced for lighting the transfer lamp TL to give the operator an indication that the transfer code has been properly transmitted and received back. This circuit may be traced from ground by way of switch SW2 in dotted operated position, armature 33, armature 85, and through the filament of the lamp TL to battery. In the receiving distributor the relays 110 and 160 lock through their lower windings in the same manner as previously described and at this time complete a circuit for energizing relays 174 and 182 in series as follows: from ground through the lower winding of relay 174, normally closed contacts controlled by armature 187, armature 114, armature 166, armature 191 and its resting contact, and through the winding of relay 182 to battery. At armature 189 relay 182 prepares a circuit for energizing relay 183 which, however, is not energized at this time because the latter relay is partially short circuited from ground through the lower winding of relay 174 and from ground at armature 189. At armature 190 relay 182 completes a circuit for energizing transfer relay 181 by way of grounded armature 196. Relay 181, upon energizing, at armature 186 disconnects the grounded armature 171 from the locking windings of the recording relays and substitutes ground from armature 107 of the start-stop magnet 106. At armature 187 relay 181 disconnects the circuit extending to relay 174 and substitutes the ground at armature 187. At armature 188 relay 181 opens a point in the circuit extending to the pulse relay 104. The relays 170, 172, 174, and 178 are now disconnected and are no longer used at this time.

The transmitting and receiving apparatus are now ready to transmit and receive a message and the operator thereupon operates the keys as before to energize the two start magnets 19 and 106, which at their respective armatures 21 and 107 open the locking circuit of any of the locked recording relays such as relays 30 and 80 in the transmitting distributor and relays 110 and 160 in the receiving distributor. The deenergization of the recording relays 30 and 80 extinguishes the lamp TL. The deenergization of relays 110 and 160 at armatures 114 and 166 opens the original energizing circuit of relay 182 and at the same time removes the short circuiting ground from around relay 183 with the result that the relay 183 now energizes in series with relay 182 as follows: from ground by way of armature 189, armature 195, through the winding of relay 183, and through the winding of relay 182 to battery. Relays 182 and 183 are maintained energized over this circuit until another transfer code is transmitted. At armature 191 relay 183 disconnects the relays 182 and 183 from the transfer conductor and connects the relay 184 thereto. At armature 192 relay 183 prepares a point in the circuit for later on energizing relay 185 when a subsequent transfer code is transmitted.

Before proceeding with the description it may be advisable at this time to describe the operations which take place when a subsequent transfer code is transmitted. For this purpose it will be assumed that the recording relays 110 and 160 are again energized by a subsequent transmitted transfer code and therefore a circuit for energizing relay 184 may be traced as follows: from ground by way of armature 191 and its working contact, and through the winding of relay 184 to battery. When the start-stop magnet 106 is energized to start the receiving distributor, ground is removed from the lower locking winding of the operated recording relays with the result that the recording relays open the original energizing circuit of relay 184 and remove the short circuit from around relay 185. This short circuit may be traced from grounded armature 187, armature 114, armature 166, transfer conductor, armature 191 and its working contact, through the winding of relay 185, armature 192 to grounded armature 193. As long as the recording relays 110 and 160 are in energized position the short circuit around relay 185 is maintained and as soon as the recording relays are deenergized the ground from conductor 187 is disconnected with the result that relay 185 energizes in series with relay 184 from grounded armature 193 and armature 192. At armature 195 relay 185 opens the circuit of relays 182 and 183 which now deenergize and at armature 196 opens the circuit of transfer relay 181 which likewise deenergizes. The deenergization of relay 182 at armature 189 opens a further point in its own locking circuit and at armature 190 opens a further point in the circuit of transfer relay 181. At armature 191 relay 183 again prepares the circuit for relay 182 and at armature 192 opens the locking circuit of relays 184 and 185 which likewise now deenergize. The transfer relays 181 to 185, inclusive, have now, therefore, been restored back to their normal position, or the position shown in the drawings, in response to the receipt of the second transfer code.

After the transmission of the first transfer code resulting in the energization of the transfer relay 181 the operator may operate the keys as fast as the same are unlocked to transmit the required message. By watching the recorder or the lamp panel the operator can see if the proper codes are being transmitted and received for each key operation. The operation of the two distributors is similar to that previously described and at the start of each rotation the start magnets 19 and 106 deenergize any of the locked recording relays by the operation of their armatures 21 and 107 and after the brushes of the distributor have moved past their start segments or when relay 20 has operated to open the start circuit extending to the start magnets. The start-stop magnets 106 and 19 are deenergized to stop the brushes after they have made one complete revolution and to release their respective armatures to provide a locking ground for the recording relays. The operation of the keys to transmit the desired message results in the operation of the two distributors for each key operation in the same manner as previously described.

The preferred checking ararngement for enabling the operator to transmit codes one after the other as soon as the keys are unlocked without checking each code comprises a differential error checking relay which is operated only when the transmitting distributor receives a code back from the receiving distributor which does not agree with the code transmitted. As long as the codes received by the transmitting distributor agree with the codes transmitted by the same for each revolution the differential error checking relay is not operated, but when there is a disagreement then the error checking relay operates to cause an error lamp to light to indicate fault or disagreement. To use this preferred checking arrangement the operator operates turn-key K to energize relay 90 over an obvious circuit. Relay 90, upon energizing, at armatures 91 to 96, inclusive, disconnects the recording relays and connects the receiving segments R1 to R6, inclusive, in multiple through the lower winding of the error check relay 26. At armature 97 relay 90 connects the upper winding of the differential error check relay 26 to the error checking segment C. The recording relays, the recorder and the lamp indicator are not used and are not needed in this circuit arrangement. The two distributors operate in the same manner as previously described in response to the different key operations and in case the key K1 is operated it will be seen that the checking segment C1 is grounded by the middle pair of springs of key K1 while the checking segment C4 is grounded by the right-hand pair of springs of key K1. The operation of the receiving distributor is identical with that previously described, while in the transmitting distributor the circuit operations are slightly different due to the disconnection of the recording relays and recorder and the substitution of the error check relay 26. In case the code is properly received and sent back by the receiving distributor then relay 86 is operated to ground the receiving segments R1 and R4 when the brush RS encounters these segments. As will be seen in the drawings the error checking segment and the receiving segment are in the same relative positions with respect to the brushes EC and RS and therefore the brush EC will reach and engage the checking segment C1 at the same time that the brush RS engages the receiving segment R1. When the brushes EC and RS reach the segments C1 and R1, which they do simultaneously, then two circuits may be traced through the upper and lower windings of the differential error checking relay 26; from ground by way of the middle spring combination of key K1, conductor 1, checking segment C1, brush EC, segment C, armature 97, and resistance through the upper winding of differential relay 26 to battery; the second circuit extends from grounded armature 88, receiving segment R, brush RS, receiving segment R1, armature 91 and its working contact, and through the lower winding of differential relay 26 to battery. Relay 26 does not energize over these circuits because its two windings are equal and oppose each other, with the result that the two windings neutralize the magnetic effect upon the armature of the relay. In a similar manner when the brushes EC and RS simultaneously engage the segments C4 and R4, circuits through both the upper and lower windings are simultaneously closed to prevent the energization of the differential relay 26.

In case of fault, such as dirty contacts, improper synchronism of the two distributors, or any other trouble which may cause the transmitting distributor to receive a code different from that which it transmitted, then it can be seen that a circuit will be completed through only one winding of the differential error check relay 26 with the result that this relay then energizes. A circuit through either winding of the differential relay alone will cause the relay to energize and at armature 27 complete a circuit for energizing relay 38. At armature 39 relay 38 completes a locking circuit for itself from grounded armature 29 and at armature 46 completes a circuit for lighting the error lamp EL. By the lighting of the error lamp EL the operator knows that some trouble has occurred and therefore stops further transmission of the message until the fault is corrected. In order to release the locked relay 38 the push-key PK is operated by the operator to complete an obvious circuit for energizing relay 28 which thereupon operates its armature 29 to open the locking circuit of relay 38. Responsive to the operation of relay 28 relay 38 deenergizes and at armature 46 opens the circuit of the error lamp EL and when the push-key PK is released the relay 28 deenergizes after an interval to release its armature 29. After the trouble has been corrected, the messages are transmitted and checked for each revolution of the distributors in the manner just described.

Having described the invention, what is considered to be new and is desired to be protected by Letters Patent will be described in the following claims.

What is claimed is:

1. In a start-stop distributor system wherein a receiving distributor is operated in synchronism with a transmitting distributor for each rotation thereof during the transmission of codes, and means associated with the receiving transmitter for transmitting back to the transmitting distributor the same identical code which it received from the transmitting distributor during a single synchronous rotation of said distributors.

2. In a start-stop distributor system wherein a receiving distributor is operated in synchronism with a transmitting distributor for each rotation thereof during the transmission of codes, means associated with the receiving transmitter for transmitting back to the transmitting distributor the same identical code which it received from the transmitting distributor during a single synchronous rotation of said distributors, and checking means associated with the transmitting distributor for checking the code received from the receiving distributor to determine if the received code agrees with the transmitted code for each single synchronous rotation thereof.

3. In a start-stop distributor system wherein a receiving distributor is operated in synchronism with a transmitting distributor for each rotation thereof during the transmission of codes, means associated with the receiving transmitter for transmitting back to the transmitting distributor the same identical code which it received from the transmitting distributor during a single synchronous rotation of said distributors, checking means associated with the transmitting distributor for checking the code received from the receiving distributor to determine if the received code agrees with the transmitted code for each single synchronous rotation thereof, and means operative for indicating disagreement in case the code sent back disagrees with the transmitted code.

4. In a distributor system, a transmitting distributor, a receiving distributor, means for starting and operating said distributors in synchronism, means in the transmitting distributor for transmitting a code during a single rotation thereof to the receiving distributor, and means in the receiving distributor for receiving and sending back said code during a single corresponding rotation thereof to the transmitting distributor.

5. In a distributor system, a transmitting distributor, a receiving distributor, means for starting and operating said distributors in synchronism, means in the transmitting distributor for transmitting a code during a single rotation thereof to the receiving distributor, means in the receiving distributor for receiving and sending back said code during a single corresponding rotation thereof to the transmitting distributor, and means associated with said transmitting distributor operated during said single rotation in response to the code sent back by the receiving distributor for checking the code to determine if the received code agrees with the transmitted code.

6. In a distributor system, a transmitting distributor, a receiving distributor, means for starting and operating said distributors in synchronism, means in the transmitting distributor for transmitting a code during a single rotation thereof to the receiving distributor, means in the receiving distributor for receiving and sending back said code during a single corresponding rotation thereof to the transmitting distributor, means associated with said transmitting distributor operated during said single rotation in response to the code sent back by the receiving distributor for checking the code to determine if the received code agrees with the transmitted code, and means for indicating disagreement in case the code sent back disagrees with the transmitted code.

7. In a distributor system, a transmitting distributor, a receiving distributor, means for starting and operating said distributors in synchronism, means in the transmitting distributor for marking a code therein and for transmitting said code to the receiving distributor during a single synchronous rotation of said distributors, means in the receiving distributor for receiving and sending back said code to the transmitting distributor during said single synchronous rotation of said distributors, and means associated with said transmitting distributor operated during said single synchronous rotation in response to the code sent back by the receiving distributor for checking the code to determine if the received sent-back code agrees with the marked transmitted code.

8. In a code transmitting system wherein different codes each comprising a plurality of pulses separated by different time intervals in each code transmission period are transmitted over a single conductor, means for transmitting a single code over said conductor in one direction and responsive thereto for simultaneously therewith receiving and retransmitting said single code back over said conductor in the opposite direction to check such transmission during a single code transmission period.

9. In a code transmitting system wherein different codes each comprising a plurality of pulses separated by different time intervals in each code transmission period are transmitted over a single conductor, means for transmitting a single code over said conductor in one direction and responsive thereto for simultaneously therewith receiving and retransmitting said single code back over said conductor in the opposite direction to check such transmission during a single code transmission period, said means including a pair of start-stop distributors operated in synchronism during each code transmission period.

10. In a code transmitting system, a transmitting circuit comprising only a single conductor, means for transmitting a single code comprising a plurality of pulses over said conductor in one direction, and means responsive thereto for receiving and retransmitting said single code back over said conductor with the pulses of the retransmitted code being concurrent with the pulses of the transmitted code.

11. In a code transmitting system, a transmitting circuit comprising only a single conductor, means for transmitting a single code comprising a plurality of pulses over said conductor in one direction, means responsive thereto for receiving and retransmitting said single code back over said conductor with the pulses of the retransmitted code being concurrent with the pulses of the transmitted code, and checking means operative in case the retransmitted code disagrees with the transmitted code.

12. In a code transmitting system, a transmitting circuit comprising only a single conductor, means for transmitting a single code comprising a plurality of pulses over said conductor in one direction, means responsive thereto for receiving and retransmitting said single code back over said conductor with the pulses of the retransmitted code being concurrent with the pulses of the transmitted code, and means operated responsive to said retransmitted code for recording said retransmitted code.

13. In a start-stop distributor system, a transmitting distributor comprising transmitting segments, error checking segments, receiving segments, and co-operating brushes, character keys, means responsive to the actuation of one of said keys for marking certain transmitting and error checking segments, means responsive to the actuation of said key for operating the brushes of said distributor in one revolution to transmit a code corresponding to the marked transmitting segments, a receiving distributor operated in synchronism with said transmitting distributor for receiving and retransmitting said code back to the transmitting distributor, and means co-operating with said retransmitted code, said marked error checking segments, said receiving segments, and co-operating brushes of the transmitting distributor during said one revolution for determining if the transmitted code agrees with the retransmitted code.

14. In a start-stop distributor system, a transmitting distributor comprising transmitting segments, error checking segments, receiving segments, and co-operating brushes, character keys, means responsive to the actuation of one of said keys for marking certain transmitting and error checking segments, means responsive to the actuation of said key for operating the brushes of said distributor in one revolution to transmit a code corresponding to the marked transmitting segments, a receiving distributor operated in synchronism with said transmitting distributor for receiving and retransmitting said code back to the transmitting distributor, means for marking the receiving segments in the transmitting distributor during said one revolution in accordance with the retransmitted code, and means co-operating with said marked error checking and receiving segments and their co-operating brushes for checking the accuracy of said transmitted and retransmitted code during said one revolution.

15. In a start-stop distributor system, a transmitting distributor comprising transmitting segments, error checking segments, receiving segments, and co-operating brushes, character keys, means responsive to the actuation of one of said keys for marking certain transmitting and error checking segments, means responsive to the actuation of said key for operating the brushes of said distributor in one revolution to transmit a code corresponding to the marked transmitting segments, a receiving distributor operated in synchronism with said transmitting distributor for receiving and retransmitting said code back to the transmitting distributor, means for marking the receiving segments in the transmitting distributor during said one revolution in accordance with the retransmitted code, said error checking segments corresponding to said receiving segments, and means operative in response to the rotation of the error checking brush and the receiving brush in said one revolution of the transmitting distributor in case the marking of said receiving segments disagrees with the marking of the error checking segments.

16. In a start-stop distributor system, a transmitting distributor, a remote receiving distributor, remote devices associated with the receiving distributor, keys corresponding to said devices associated with the transmitting distributor, means responsive to the operation of one of said keys for operating the transmitting and receiving distributors in synchronism for one revolution, means including said transmitting distributor for transmitting a code during said revolution corresponding to the key actuated, means associated with the receiving distributor operated in response to said transmitted code for selecting the device corresponding to the actuated key and for retransmitting said code back to the transmitting distributor during said synchronous revolution, means associated with the transmitting distributor for recording the retransmitted code during said single synchronous revolution thereby recording the accuracy of the transmitted and retransmitted code to insure correct selection of the desired device, a time delay operating means for operating the selected device, automatic means for transmitting an impulse from the receiving distributor to the transmitting distributor in response to the actual operation of said device, automatic means responsive thereto for transmitting an impulse from the transmitting distributor to the receiving distributor to release the selecting means, and a wipe-out key for reoperating said distributors to wipe out the prepared selection if operated a predetemined time before the time delay operating means is fully operated.

17. In a start-stop distributor system, a transmitting distributor having a plurality of transmitting segments and corresponding checking and receiving segments, character keys associated with said distributor, means responsive to the operation of one of said keys for marking certain of said transmitting and corresponding checking segments and for operating said distributor to transmit a code in accordance with the marked transmitting segments, means including a remote synchronously operated receiving distributor for receiving said code and for retransmitting said code back to said transmitting distributor, means responsive to said retransmitted code for marking said receiving segments in accordance with the retransmitted code, a differential relay having two windings, means connecting said receiving segments to one winding of said relay, means for connecting said checking segments to the other winding of said relay, and means for operating said relay in case said marking means fails to mark receiving segments corresponding to the marked checking segments.

18. In a start-stop distributor system, a transmitting distributor having a plurality of transmitting segments and corresponding checking and receiving segments, character keys associated with said distributor, means responsive to the operation of one of said keys for marking certain of said transmitting and corresponding checking segments and for operating said distributor to transmit a code in accordance with the marked transmitting segments, means including a remote synchronously operated receiving distributor for receiving said code and for retransmitting said code back to said transmitting distributor, means responsive to said retransmitted code for marking said receiving segments in accordance with the retransmitted code, checking means associated with said transmitting distributor, means connecting said receiving segments to said checking means, means for connecting said checking segments to said checking means, and means for operating said checking means in case said marking means fails to mark receiving segments corresponding to the marked checking segments.

19. In a start-stop distributor system, a transmitting distributor having a plurality of checking segments and a corresponding plurality of receiving segments, means for operating said distributor, a differential relay having two windings, means connecting said receiving segments to one winding of said relay, means for connecting said checking segments to the other winding of said relay, means for marking corresponding checking and receiving segments, and means responsive to the operation of said distributor for operating said relay in case said marking means fails to mark corresponding checking and receiving segments.

20. In a start-stop distributor system, a transmitting distributor having a plurality of checking segments and corresponding receiving segments, means for operating said distributor, means for marking corresponding checking and receiving segments, checking means associated with said distributor, and means responsive to the operation of said distributor for operating said checking means in case said marking means fails to mark corresponding checking and receiving segments.

21. In a transmitting and checking system, a transmitting device having a plurality of checking positions and corresponding receiving positions, means for operating said device, means for marking corresponding checking and receiving positions, and checking means operated responsive to the operation of said device in case said marking means fails to mark corresponding checking and receiving positions.

22. In a transmitting system, a transmitting device, a receiving device, means for starting and operating said devices in synchronism, means in the transmitting device for transmitting a signal consisting of a series of impulses during a single rotation thereof to the receiving device, means in the receiving device for receiving said transmitted signal and for sending back a corresponding checking signal comprising a series of impulses during a single corresponding rotation thereof to the transmitting device, and checking means operative in case said checking signal fails to correspond to said transmitted signal.

23. In a transmitting system, a transmitting device, a receiving device, means for starting and operating said devices in synchronism, means in said transmitting device for transmitting a coded signal during a single rotation thereof to the receiving device, means including relays operated in the receiving device in response to said transmitted signal for sending back a corresponding checking signal during a single corresponding rotation thereof to the transmitting device, checking means operative in case the code of said checking signal fails to correspond to the code of said transmitted signal, and means for releasing said operated relays at the commencement of a succeeding signal.

24. In a transmitting system, a transmitting device, a receiving device, means for starting and operating said devices in synchronism, means in the transmitting device for transmitting a signal to said receiving device during a single rotation thereof, means in the receiving device for receiving said transmitted signal and for sending back a corresponding checking signal during a single corresponding rotation thereof to the transmitting device, means for recording said checking signal upon receipt thereof, and means for delaying the recording of said transmitted signal for an interval.

25. In a transmitting system, a transmitting device, a receiving device, means for starting and operating said devices in synchronism, means in the transmitting device for transmitting a signal to said receiving device during a single rotation thereof, means in the receiving device for receiving said transmitted signal and for sending back a corresponding checking signal during a single corresponding rotation thereof to the transmitting device, means for recording said transmitted signal, and means for transmitting additional signals while said devices are at rest for indicating completion of the recording operation.

26. In a transmitting system, a transmitting device, a receiving device, means for starting and operating said devices in synchronism, means in the transmitting device for transmitting a signal to said receiving device during a single rotation thereof, means in the receiving device for receiving said transmitted signal and for sending back a corresponding checking signal during a single corresponding rotation thereof to the transmitting device, means for recording said checking signal upon receipt thereof, means for delaying the recording of said transmitted signal for an interval, and means operative in case a special signal is transmitted from said transmitting device for disabling said delaying means so that further transmitted signals from said transmitting device are thereafter recorded upon receipt by said receiving device.

27. In a transmitting system, a transmitting device, a distant receiving device, means in the transmitting device for transmitting distinctive signals to the distant receiving device, means in the distant receiving device operated in response to the receipt of said transmitted signal for sending back checking signals varying in accordance with the signals received to the transmitting device, and checking means operative only in case the transmitted signal disagrees with the corresponding checking signal.

28. In a transmitting system, a transmitting device, a receiving device, means for starting and operating said device in synchronism, means in the transmitting device for transmitting a code of impulses to the receiving device during a single cycle thereof, means in the receiving device responsive to the receipt of a code of impulses for transmitting back to the transmitting device a code of impulses corresponding to the code received, and means in the transmitting device controlled by both codes of impulses and operated only when the codes do not agree.

HAROLD C. ROBINSON.